United States Patent
Coppersmith et al.

(10) Patent No.: US 6,189,095 B1
(45) Date of Patent: Feb. 13, 2001

(54) SYMMETRIC BLOCK CIPHER USING MULTIPLE STAGES WITH MODIFIED TYPE-1 AND TYPE-3 FEISTEL NETWORKS

(75) Inventors: Don Coppersmith, Ossining; Rosario Gennaro, New York; Shai Halevi, Heartsdale; Charanjit S. Jutla, Elmsford, all of NY (US); Stephen M. Matyas, Jr., Manassas, VA (US); Luke James O'Connor, Adliswil (CH); Mohammed Peyravian, Cary, NC (US); David Robert Safford, Brewster; Nevenko Zunic, Wappingers Falls, both of NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/092,125

(22) Filed: Jun. 5, 1998

(51) Int. Cl.[7] .................................................... H04L 9/00
(52) U.S. Cl. ..................................... 713/150; 380/37
(58) Field of Search ............................. 380/37, 43, 28, 380/29

(56) References Cited

U.S. PATENT DOCUMENTS

| | | |
|---|---|---|
| 4,157,454 * | 6/1979 | Becker ..................... 178/22 |
| 4,375,579 | 3/1983 | Davida et al. . |
| 5,432,848 | 7/1995 | Butter et al. . |
| 5,481,613 | 1/1996 | Ford et al. . |
| 5,513,262 | 4/1996 | van Rumpt et al. . |
| 5,548,648 | 8/1996 | Yorke-Smith . |
| 5,666,414 | 9/1997 | Micali . |
| 5,673,319 | 9/1997 | Bellare et al. . |

OTHER PUBLICATIONS

B. Schneier, Description of a New Variable–Length Key, 64–Bit Block Cipher (Blowfish), Dec. 1993.*
Y. Zheng, On the Construction of Block Ciphers Provably Secure and Not Relying on Any Unproved Hypothesis, 1989.*
B. Schneier et. al., Unbalanced Feistel Networks and Block–Cipher Design, 1996.*
B. Schneier, Applied Cryptography 2e John Wiley pp. 193, 198–201, 347, Dec. 1993.*

* cited by examiner

Primary Examiner—Gail O. Hayes
Assistant Examiner—James Seal
(74) Attorney, Agent, or Firm—Jeanine S. Ray-Yarletts; Marcia L. Doubet

(57) ABSTRACT

The present invention provides a technique, system, and computer program for a symmetric key block cipher. This cipher uses multiple stages with a modified Type-3 Feistel network, and a modified Unbalanced Type-1 Feistel network in an expansion box forward function. The cipher allows the block size, key size, number of rounds of expansion, and number of stages of ciphering to vary. The modified Type-3 cipher modifies the word used as input to the expansion box in certain rounds, to speed the diffusion properties of the ciphering. The modified Type-3 and Type-1 ciphers are interleaved, and provide excellent resistance to both linear and differential attacks. The variable-length subkeys and the S-box can be precomputed. A minimal amount of computer storage is required to implement this cipher, which can be implemented equally well in hardware or software (or some combination thereof).

35 Claims, 4 Drawing Sheets

>>n -- rotate right n bits (32 bit)

-- 32 bit addition

-- 32 bit xor

■→ Key dependent, identical S-box with 6 bit input, and 32 bit output. Input is the lower 6 bits.

SYMMETRIC BLOCK CIPHER USING MULTIPLE STAGES WITH MODIFIED TYPE-1 AND TYPE-3 FEISTEL NETWORKS

RELATED INVENTIONS

IBM application Ser. No. 09/027,765 entitled "Method and Apparatus for a Symmetric Block Cipher using Multiple Stages", and IBM application Ser. No. 09/027,769 entitled "Method and Apparatus for a Symmetric Block Cipher using Multiple Stages with Type-1 and Type-3 Feistel Networks", both filed Feb. 23, 1998.

BACKGROUND OF THE INVENTION

1. Field of the Invention

The present invention relates to cryptography, and deals more particularly with a system and method for a symmetric key block cipher. This cipher uses multiple stages with a modified Type-3 Feistel network, and a modified Unbalanced Type-1 Feistel network in an expansion box forward function. The cipher allows the block size, key size, number of rounds of expansion, and number of stages of ciphering to vary. The modified Type-3 cipher modifies the word used as input to the expansion box in certain rounds, to speed the diffusion properties of the ciphering.

2. Description of the Related Art

Cryptography is a security mechanism for protecting information from unintended disclosure by transforming the information into a form that is unreadable to humans, and unreadable to machines that are not specially adapted to reversing the transformation back to the original information content. The cryptographic transformation can be performed on data that is to be transmitted electronically, such as an electronic mail message, and is equally useful for data that is to be securely stored, such as the account records for customers of a bank or credit company.

The transformation process performed on the original data is referred to as "encryption". The process of reversing the transformation, to restore the original data, is referred to as "decryption". The terms "encipher" and "decipher" are also used to describe these processes, respectively. A mechanism that can both encipher and decipher is referred to as a "cipher".

Data encryption systems are well known in the data processing art. In general, such systems operate by performing an encryption operation on a plaintext input block, using an encryption key, to produce a ciphertext output block. "Plaintext" refers to the fact that the data is in plain, unencrypted form. "Ciphertext" indicates that the data is in enciphered, or encrypted, form. The receiver of an encrypted message performs a corresponding decryption operation, using a decryption key, to recover the original plaintext block.

A cipher to be used in a computer system can be implemented in hardware, in software, or in a combination of hardware and software. Hardware chips are available that implement various ciphers. Software algorithms are known in the art as well.

Encryption systems fall into two general categories. Symmetric (or secret key) encryption systems use the same secret key for both encrypting and decrypting messages. An example of a symmetric encryption system is the Data Encryption Standard (DES) system, which is a United States federal standard described in NBS FIPS Pub 46. In the DES system, a key having 56 independently specifiable bits is used to convert 64-bit plaintext blocks to ciphertext blocks, or vice versa.

Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key. Perhaps the best-known asymmetric encryption system is the RSA encryption system, named after its originators Rivest, Shamir, and Adleman.

The category of symmetric encryption systems can be further subdivided into those which operate on fixed size blocks of data (block ciphers), and those which operate on arbitrary length streams of data (stream ciphers).

While there are many methods of symmetric key block encryption, most popular methods are based on Type-2 Feistel Networks. A Type-2 Feistel Network consists of dividing the data to be encrypted into two halves, and then performing some number of rounds, where each round consists of transforming the left half of the data based on the right half of the data, and then transforming the right half based on the modified left half. The two transformations are called subrounds. These transformations must be invertible. That is, it must be possible to perform some set of operations during decryption that will reverse the transformations performed during encryption. In a standard Feistel network, some non-invertible function of one half of the data is simply exclusive-OR'd with the other half, as the exclusive OR operation provides invertibility, but any invertible function may be used in the general case.

Feistel Networks are not limited to this case of dividing the data into two equal halves. Alternatively, in a Type-1 Feistel the data is divided into n equal words, where n>2. If these words are labeled $A(1)$ to $A(n)$, then a full round consists of n subrounds, where each subround consists of transforming word $A(i)$ based on the value of word $A(i-1)$ (with $A(1)$ transformed by $A(n)$).

Similarly, a Type-3 Feistel can be constructed in which the data is divided into n equal words, where n>2, but in which each word is used to transform more than one (possibly all) of the other words. For example, $A(1)$ could be used to transform $A(2)$, $A(3)$, and $A(4)$ in one subround. A full round consists of n such subrounds.

Feistel based ciphers typically add additional invertible transformations before, and/or after, each full round. For example, some ciphers exclusive-or the entire data block with subkey data before the first round, to complicate certain attacks. "Subkey" refers to using a different key during different rounds, where the subkey values are derived from an input key.

The distinguishing features of different Feistel based ciphers are determined by the choice of the function used to modify a given data word in each subround. Different functions provide different tradeoffs between speed, data size, and security.

Many ciphers, such as DES, base their subround functions on a construct called a substitution box, or S-box, which is an array of data elements. In operation, a cipher block data word is used as an index into the S-box, and the value at that location is then used as the output value. The entries in the S-box are carefully chosen to have good properties for resistance to various attacks, including differential and linear analysis. Some desirable properties of S-boxes include that if the input words vary by one bit, on average, half the output bits should change, so that even small changes in the input data rapidly spread to all the output bits. Also, the entries in the S-box should be chosen to have little correlation to the index, to provide good resistance to linear attacks. While S-box based functions may provide excellent security, they tend to be slow in software implementations, especially on processors with small register sets, due to the costs of index calculation, and the corresponding higher use of register resources.

Other ciphers, such as RC5, base their subround functions on bit-wise rotations, in which one data word is used to specify an amount to rotate the target word. (RC5 is described in "The RC5 Encryption Algorithm", Second International Workshop on Fast Software Encryption, by R. L. Rivest (1995)). Data-dependent rotation provides a very fast subround function, as there are no index calculations and no memory references needed, and all the operations can be kept within the registers. Data-dependent rotations, however, tend to have relatively poor resistance to differential attacks, requiring more rounds to ensure security.

Feistel ciphers tend to be based on length-preserving pseudorandom functions. A length-preserving function is one that takes an input of b bits, and returns a transformed value also having b bits. For example, in a Type-2 Feistel network, where the input block is divided into two halves, b represents the length of each half. Thus as each half is transformed during operation of the cipher, the overall block length of 2b bits is maintained. However, ciphers are also known which do not divide the blocks into components of equal size. These ciphers are referred to as Unbalanced Feistel Networks (UFNs). In a UFN, the block "M" may be described as having some length (s+t). Let $L_0$ denote the most significant s bits of M (that is, the leftmost s bits), and let $R_0$ denote the least significant t bits (that is, the rightmost t bits), and assume that s<t. The UFN will process for some number of rounds, where the output message after round i, $M_i$, can be denoted $M_i = L_i \cdot R_i$ (where the symbol "•" represents concatenation). The pseudorandom function $f_k$ which is used during each round of the UFN takes as its input an operand having s bits, and returns a value having t bits: that is, $f_k$ is not length-preserving. Using this definition of $f_k$, the output of round i may be described as $M_i = [f_{ki}(L_{i-1}) \oplus R_{i-1}] \cdot L_{i-1}$ (where exclusive OR is shown as an example of a typical invertible round function). As shown by this definition of $f_k$, its input operand has s bits, because ($L_{i-1}$) is defined as the leftmost s bits. A t-bit result is generated, because $f_k$ is defined as an "s to t" function. This result is then exclusive OR'd (in this example) with the same-sized value $R_{i-1}$. Thus, $M_i$ for any value i is formed by concatenating a t-bit operand with an s-bit operand, maintaining the overall length of (s+t). Since $f_k$ expands the number of bits of its input (from s to t), such a function is referred to herein as an "expansion box", or "expansion function".

Examples of ciphers using UFNs are BEAR and LION. These ciphers are described in "Two Practical and Provably Secure Block Ciphers: BEAR and LION", 1996 Workshop on Fast Software Encryption, by R. Anderson and E. Biham (1996). However, these existing UFNs perform a round function that consists of expanding one of the input words, and using this to modify the other words. The word fed into the expansion box for a given round is typically left unchanged by that round. (As shown in the above example, the component ($L_{i-1}$) is concatenated without change to form the new rightmost portion of M.)

In view of the above, a stronger, more flexible cipher is needed. One way to make a cipher stronger is to increase the number of rounds of ciphering performed: with each successive transformation, the resulting encryption becomes more difficult to break. Another way to increase the strength is to increase the size of the key. Since the contents of the key remain secret, increasing the size adds another level of difficulty for anyone trying to deduce what transformations may have been performed on the original data, because they are unlikely to guess the random number combination making up the key. Yet another way to increase algorithm strength is to increase the size of the "block" on which the cipher performs its transformations. A block is the unit of original data processed during one ciphering operation. The larger the block size, the more difficult it becomes for an adversary to construct a dictionary of plaintext and matching ciphertext, for a given key, large enough to pose a threat to the security of the algorithm. Further, different keys (i.e., subkeys) can be used for each round, increasing the number of random number combinations that would have to be correctly guessed in order to break the cipher.

It will be appreciated that when a cipher allows varying the number of stages (and therefore the total number of rounds), the key size, the key values, and the block size at the same time, an incredibly difficult challenge is presented to a person attempting to discover the original data contents from an encrypted result. It will also be appreciated that the computations involved to cipher the data are quite complex, and that while performing more rounds of ciphering increases the strength of the result, it also causes computation time to increase. When data is very sensitive, this time spent in ciphering will be warranted. It may be, however, that less sensitive data does not warrant the added time and expense of many rounds of ciphering. By providing an algorithm where the number of rounds of expansion, the number of stages of ciphering, the key size and values, and the block size are variable, the ultimate choice between the level of security required and the amount of computation time utilized rests with the user. By allowing these factors to vary, the cipher of the present invention becomes, in effect, scalable in three dimensions.

Existing symmetric key block ciphers using UFNs may provide for variation in the key size, the block size, and the number of rounds of ciphering, but these ciphers leave unchanged the input word that was fed into the expansion box for each round. Therefore, if the input word is divided into N components, only (N−1) are changed in each round.

Accordingly, a need exists for an improved and more flexible symmetric block cipher which offers excellent resistance to linear and differential attacks; operates quickly and efficiently while using S-boxes; uses an efficient round function; combines the benefits of both Type-1 and Type-3 Feistel networks; uses a UFN with improved mixing properties; and supports a variable length key, variable length block, a variable number of rounds of expansion, and a variable number of stages of ciphering.

The technique of the present invention achieves these objectives while using multiple stages with the fast operations of table lookup, exclusive OR, addition, subtraction, and bitwise rotation, thereby minimizing the time required to encrypt and decrypt data. The mixing properties of the modified Type-3 Feistel which invokes the modified Type-1 UFN of this technique are increased over typical UFNs by using a feedback in certain rounds. This feedback causes the data word which is used in that round to modify the other data words, left unchanged in typical Feistel UFNs, to also be modified itself. Further, bit-wise rotation is used after certain rounds to further speed the mixing properties of the cipher. The modified Type-1 UFN is implemented as a forward expansion function, which is used during both encryption and decryption. Because this function is a forward function, the necessity of inverting its encryption operations during decryption is removed (thus permitting re-use of the hardware circuit or software routine implementing that function). The UFN uses a novel approach to a Feistel Type-1 network, whereby a word may be used to modify any of the other words of the block, not just the next sequential word of the block. The data-independent subkeys can be precomputed, further minimizing the time required for encryption and decryption. The S-box can be precomputed as well. A minimal amount of computer storage is required for data used in the operation of the cipher.

SUMMARY OF THE INVENTION

An object of the present invention is to provide a technique whereby data can be encrypted in such a manner as to make discovery of the underlying data contents, other than by use of the corresponding decryption technique, computationally infeasible.

Another object of the present invention is to provide a technique whereby encryption is accomplished using a symmetric key block cipher with a strength better than that of existing symmetric block ciphers, with significantly improved efficiency.

Another object of the present invention is to provide a solution that does not use a significant amount of computer storage, in order to maximize the number of environments in which the solution can be used, including limited-storage devices such as those known as "Smart Cards".

Another object of the present invention is to provide a technique whereby decryption of the encrypted data restores the data to its original contents, in an efficient and error-free manner.

Another object of the present invention is to provide a solution that can be implemented in hardware or in software.

Another object of the present invention is to provide a solution that allows precomputing the subkeys and/or the S-box to be used for each round of ciphering, in order to minimize the time required for encrypting or decrypting an individual file or message.

Still another object of the present invention is to provide a technique whereby the cipher used for encryption and decryption uses multiple stages, where each stage uses multiple Feistel network types that affect each word of the block. This use of differing network types makes the cipher much more resistant to attack, because an attack that is successful against one type of transformation must then be successful against the next type of transformation as well— which is incredibly difficult to accomplish. Thus, any weakness that exists in one of the transformation types will be cancelled out by the other transformation type.

A further object of the present invention is to provide a technique whereby the cipher uses a variable number of rounds of expansion, a variable number of stages (and therefore rounds) of processing during encryption and decryption, a variable length block of data as the unit to be encrypted and decrypted, and a variable length key. Allowing these factors to vary will provide the user with choices that will not only affect execution time and strength of security for any given use of the cipher, but will also allow variation between subsequent uses of the cipher, further increasing the difficulty of breaking encrypted data from a given source. The variation capability makes the cipher scalable in three dimensions, providing the user with flexibility to tune the algorithm to achieve the proper trade-off between execution time required and security achieved, in order to meet the needs of his particular application.

Yet another object of the present invention is to provide a technique whereby particular values for the variable information used by the algorithm—i.e., key length, block length, and number of rounds of expansion, and number of stages— can be factored into the software or hardware implementation, as fixed values, in order to optimize performance.

This invention describes a novel Feistel based symmetric block cipher, using a hybrid structure with multiple stages having multiple types of Feistel networks. Each stage affects each word of the block. The stage function is designed as a modified Type-3 Feistel network which invokes an expansion function designed as a modified Type-1 Unbalanced Feistel Network. Different functions are used in the rounds and subrounds of the stages of both network types. In order that the expanded word is also modified by the expansion function, bit-wise rotations and feedback are used in several of the rounds. This speeds the mixing of the bits over ciphers that implement UFNs today. By using multiple network types in an interleaved manner, each with multiple subrounds having different functions, the overall cipher can provide a better combination of attributes than a cipher based on a single network type and a single subround function.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a technique, system, and method for implementing a symmetric key block cipher supporting a variable number of stages, a variable length input key, a variable length block, and a variable number of rounds of an expansion function, wherein the stages have a plurality of rounds, and the rounds have a plurality of subrounds, comprising: a subprocess for generating a plurality of subkeys using the input key and a first pseudorandom function; a subprocess for generating a substitution box (S-box) using the input key and a second pseudorandom function, wherein the second pseudorandom function may be identical to the first; a subprocess for accessing and retrieving values from the S-box; a subprocess for encrypting a plurality of input data words of a plurality of input data blocks of an input data file using the S-box and a plurality of generated subkeys, producing a corresponding plurality of encrypted data words of a plurality of encrypted data blocks of an encrypted data file, the subprocess for encrypting comprising a first set of stages, wherein each of the rounds of the first set comprises using a modified Type-3 Feistel network which invokes a first modified Type-1 unbalanced Feistel network for the expansion function; and a subprocess for decrypting each of the encrypted data words using the S-box and the plurality of generated subkeys, resulting in restoration of the plurality of input data words, wherein the subprocess for decrypting comprises a second set of stages, wherein each of the rounds of the second set comprises using an inverse of the modified Type-3 Feistel network which invokes a second modified Type-1 unbalanced Feistel network. This second modified Type-1 unbalanced Feistel network may be an inverse of the first modified Type-1 unbalanced Feistel network, or it may be identical to the first modified Type-1 unbalanced Feistel network (the first modified Type-1 unbalanced Feistel network being a forward function). In either case, this expansion function preferably further comprises applying a bit-wise rotation in a plurality of its rounds, and the subprocess for encrypting preferably further comprises modifying an input word of the expansion function in selected ones of the rounds of the stages. This modification may comprise applying a bitwise rotation to the input word in a plurality of the selected rounds, applying a feedback operation using the input word in a plurality of the selected rounds, or both. The feedback preferably comprises an invertible function such as addition or exclusive OR. Optionally, the cipher implementation may be optimized by having values entered before a final production of the code, and wherein said values fix one or more of the variables supported. One or more of the subprocesses may be embodied in a hardware chip.

The present invention will now be described with reference to the following drawings, in which like reference numbers denote the same element throughout.

DESCRIPTION OF THE PREFERRED EMBODIMENT

Figure 1:
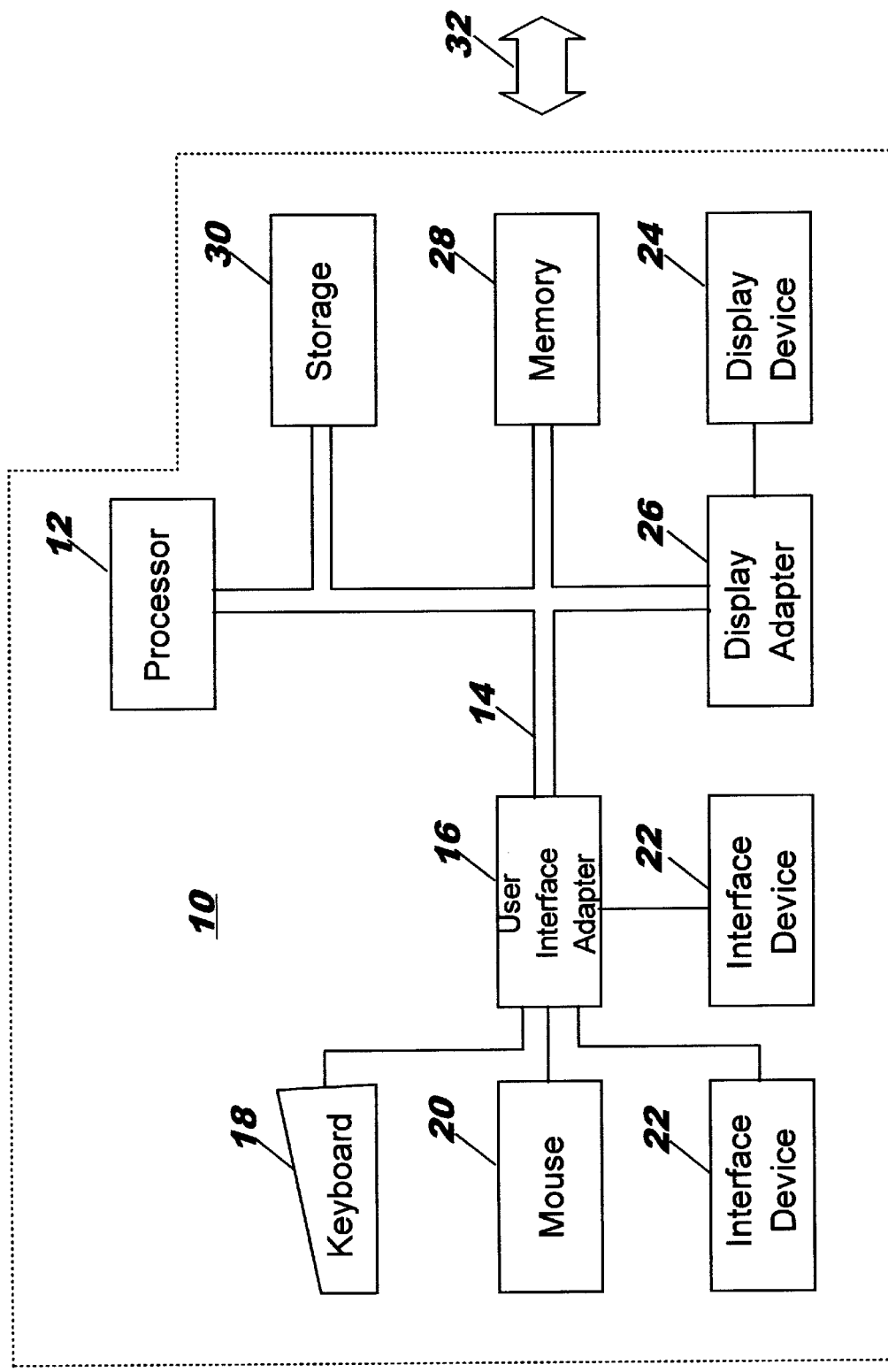
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
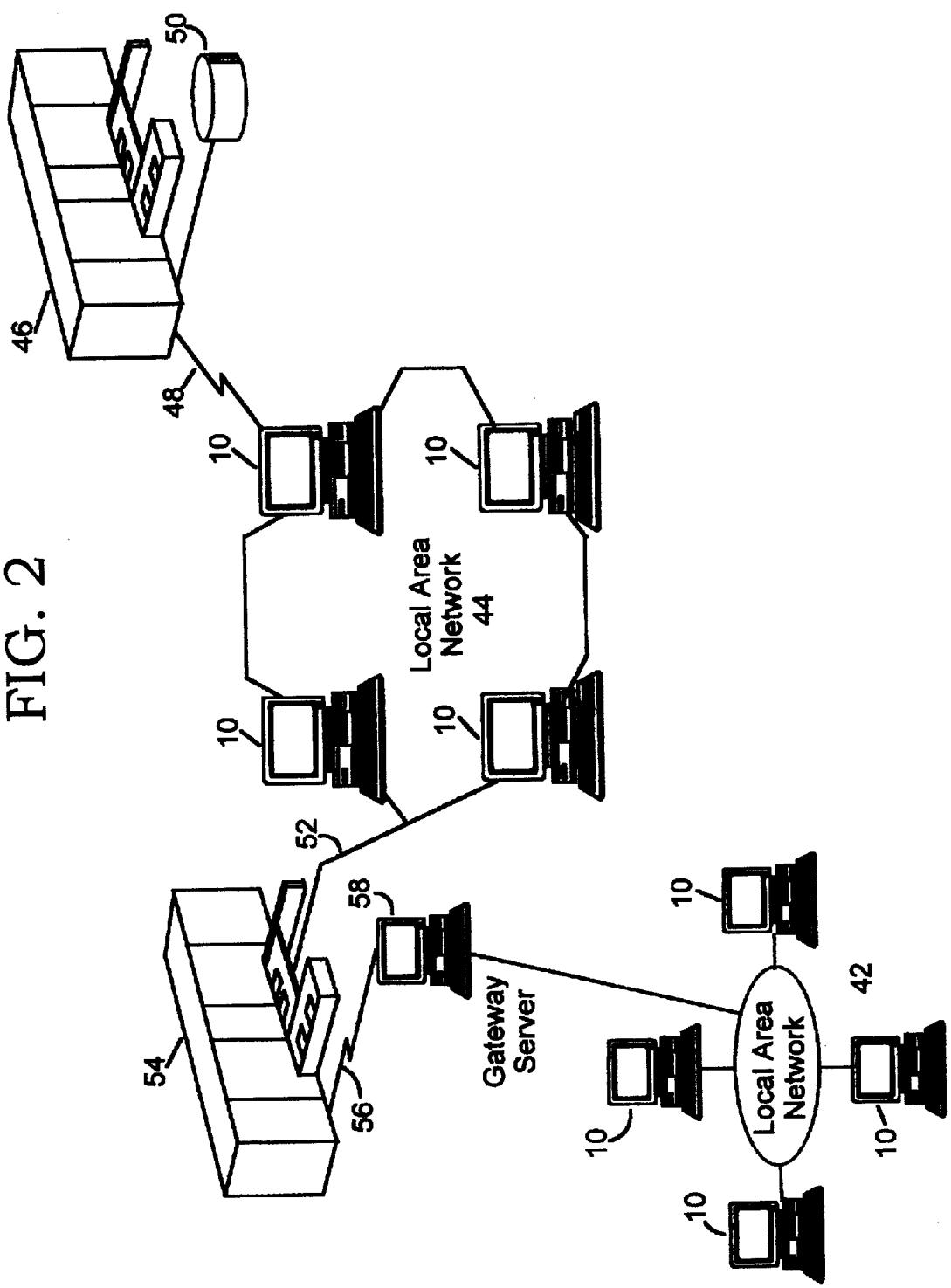
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The encrypted data resulting from use of the present invention may be stored on any of the various media types used by the long-term storage 30, or may be sent from the workstation 10 to another computer or workstation of the network illustrated in FIG. 2 over the communications channel 32, for storage by that other computer or workstation. The encrypted data may be decrypted at the same computer or workstation where it was encrypted, or it may be decrypted at a different computer or workstation.

In a hardware solution, the present invention may be embodied in the processor 12 of the workstation 10. Techniques for implementing logic functions in processors are well known in the art.

Figure 3:
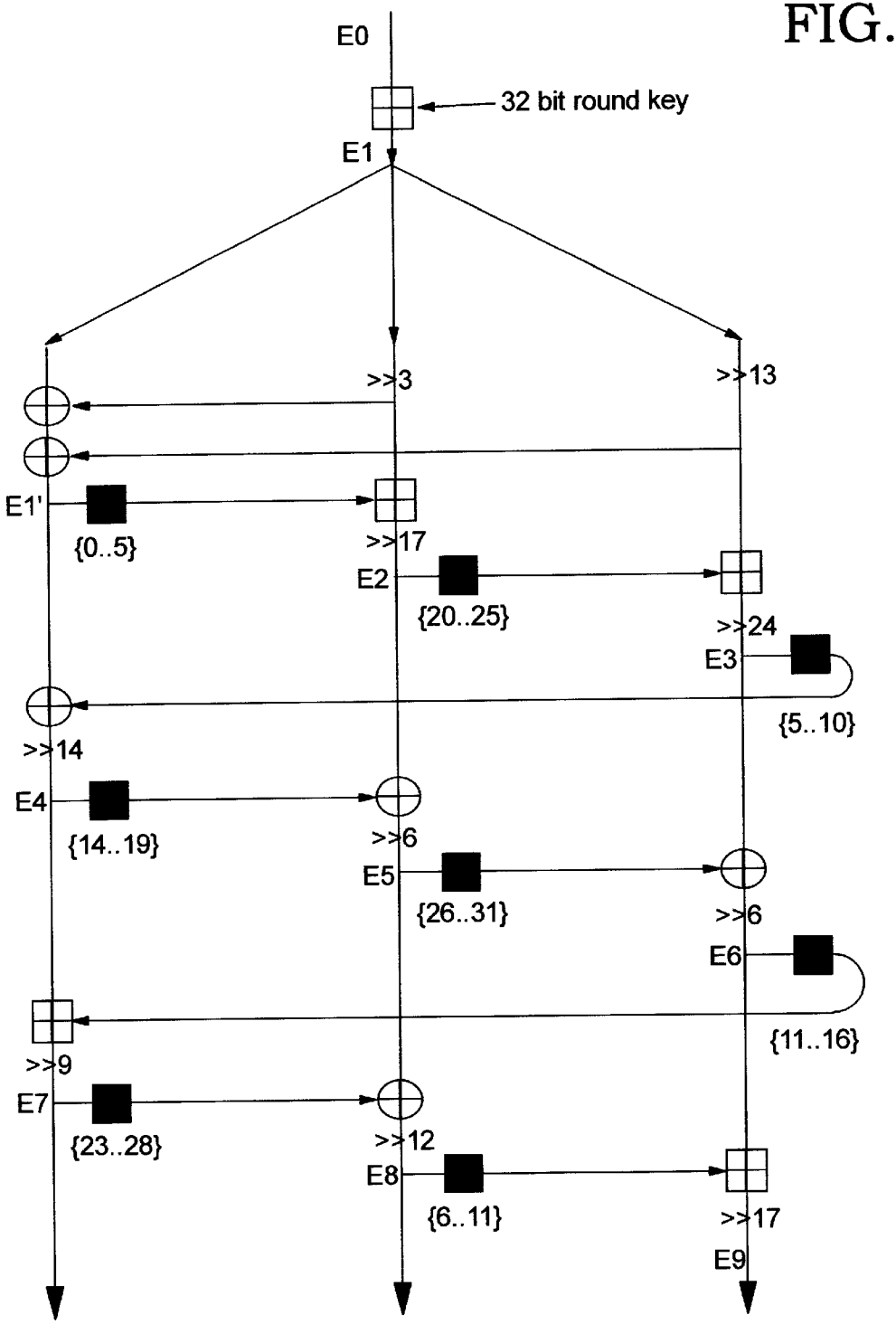
FIG. 3 shows a flow diagram of the modified Unbalanced Feistel Type-1 network expansion function of the preferred embodiment, which is invoked during several subrounds of each round of the Type-3 process.
Figure 3:
Figure 3:

The preferred embodiment of the present invention will now be discussed with reference to FIGS. 3 and 4.

In the preferred embodiment, the present invention is implemented as a computer software program, although the functions may be implemented equally well in hardware, or in a combination of hardware and software. This software performs the derivation of subkeys from an input key for use during the rounds of the cipher, the encrypting of the data contents, and the decrypting of the data contents. The data may represent a message to be communicated over a network. The message may represent any of a number of types of information, such as conversational text sent as electronic mail, or a purchase request containing the buyer's credit card or account data. Alternatively, the data may be a conventional data file. Examples of this type of data include patient medical history, customer credit history, income tax and earnings data, and any conceivable stored information that needs to be protected from unintended disclosure. This type of data may be encrypted for transmission over a network, or it may be encrypted merely for secure storage. For ease of reference, the input data file or message will be referred to herein as an "input file".

The present invention encrypts and subsequently decrypts the data using a symmetric key block-oriented cipher. The concepts of block-oriented ciphers and symmetric keys are well known in the art.

The present invention also provides a technique for using variable block sizes, variable key sizes, a variable number of rounds of expansion, and a variable number of stages of cipher processing. The purpose of allowing these variables is to give the user of the cipher the flexibility to choose trade-offs between the increased computing time required (for example, as the size of the block increases) and the strength of the resulting encryption.

Optionally, the present invention allows the software or hardware implementation of the cipher algorithm to be optimized for particular values of the variables. This is done by allowing a user of the cipher to enter values for block size, key size, number of rounds of expansion, and/or number of stages before the final step of producing the cipher implementation. The final implementation then treats the values as being fixed, and is optimized for those fixed values.

Decryption of data is accomplished in the present invention using the inverse of the data encryption, where the processes used for encryption are performed in reverse order, and the operations performed in each round and subround are inverted. By performing inverse processing, in inverse order, the encrypted data is restored to its original content. An important exception to inverting the encryption functions is the forward function used in the expansion box. Because this function is not inverted, significant time can be saved during decryption. Additionally, computing resources can be optimized by re-using the implementation of the encryption forward function during decryption—whether the cipher is implemented in software or in hardware.

The inventive concepts of the present invention define a general approach which can be used with data blocks and keys of differing sizes, varying number of rounds of expansion, and a varying number of stages. For the description of the preferred embodiment, specific values will be used to facilitate description of the processing, although the same methods can be applied with other values.

Specific functions are shown for each of the round functions in the stages of the preferred embodiment for the modified Type-1 and Type-3 networks. However, changes may be made to those round functions without deviating from the inventive concepts of the present invention.

For this description of the design, assume that the data used in the algorithms has the following sizes:

number of bits per word=32,
number of words in the key=4, (for a 128-bit key)
number of words in the data block, M=4, (for a 128-bit block) and
number of words in the expanded key array=12 (for a total of 384 bits).

Two functions are used in the operation of the cipher, as follows:

$ROT_m(x)$ rotates the word x by m positions to the right $IROT_m(x)$ rotates the word x by m positions to the left. This is the inverse of the right rotation function.

The cipher has three major component functions: key setup, encryption, and decryption.

Note that the processes shown do not show a user entering particular values to be used for the variables (defining the block size, key size, number of rounds of expansion, and number of stages), nor a value to be used for the key. The user will have been prompted to enter these values upon invoking the cipher function, or the values will be read from a file. Alternatively, if an optimized implementation of the cipher is being used, the user will have been prompted to enter one or more of these values before the final step of producing the cipher implementation (e.g. compiling the cipher code) has completed. Techniques for entering values required by an implementation are well known in the art.

KEY SETUP PHASE

Subkeys are generated using an input key. A user of the invention may be prompted, for example from a computer terminal, to enter the input key. Alternatively, the input key could be read from a file stored on disk, or passed as a parameter to a computer program embodying the present invention. The key setup phase may be performed immediately prior to the encryption phase when encrypting a particular input file, or the subkeys may be generated well in advance of the encryption. In the latter case, the subkeys would be stored for later use, in order to minimize the time required to encrypt a data file. Regardless of when the subkeys are generated, the generation process follows the same steps.

An expansion process is performed on the input key, to create an expanded key array (as previously defined). Expanding the input key in this manner allows greater randomness for the subkeys used during the encryption rounds, without requiring a key of very large size to be input to the cipher. For example, in the preferred embodiment, the input key is 128 bits long (4 words, each having 32 bits), whereas the expanded key is 384 bits long (12 words each having 32 bits). The entries in this expanded key array are then used as subkeys during the rounds of encryption, and the corresponding rounds of decryption. Techniques for key expansion are well known in the art. The following is one way of expanding keys for use with the present invention.

In the preferred embodiment, key setup is performed by filling the expanded key array with values generated using iterated pseudorandom functions that use a counter, i, and the input key K as parameters, as specified with the following pseudo-code:

```
for (i=0; i<n; i++)
    E[i]=PRF(K∥i∥K);
``` where PRF is some pseudorandom function using the concatenation of input parameters i and K, returning a word. Preferably, the input parameter i will be concatenated between 2 copies of the key K, to isolate the fixed number between random values. It will be understood by one skilled in the art that this pseudo-code indicates that the value used for the counter begins at zero; increases by one for each iteration; and that the iterative process is repeated for each value from zero up through and including the value (n−1). Thus, a value is assigned to each of the n words of the expanded key array. Alternatively, a pseudorandom function may be used that returns more than one word. In that situation, the pseudo-code would need to be changed. The following example assumes a different pseudorandom function, referred to as PRF1, which uses the concatenation of input parameters i and K, and returns a value of size x:

```
for (i = 0; i < n; i += x)    {
    temp = PRF1 (K ∥ i ∥ K);    /* where temp is an array of size x */
    for (j = 0; j < x; j++)
        E [i + j] = temp [j];    }
```

In the preferred embodiment, the pseudorandom function is the secure hashing function commonly referred to as "SHA-1". This hashing function is defined in NIST FIPS 180-1, titled "Secure Hash Standard". The SHA-1 function returns a 5-word result each time it is invoked. For this function, and any other pseudorandom function which returns more than one word, the preferred embodiment key setup phase "tiles" the output values into the expanded key array, as indicated by the pseudo-code shown above using PRF1. That is, the multi-word output is used as multiple sequential array elements, following the sequential group of elements created from the prior invocation of the pseudorandom function. For example, the value returned from the first invocation of SHA-1 is used as elements E[0] through E[4], the value returned from the second invocation is used as elements E[5] through E[9], etc. When the pseudorandom function returns more than one word, the preferred embodiment discards any unneeded words from the end of the returned value that exceed the dimension of the expanded key array.

In the preferred embodiment, using the dimensions given previously as values for describing the preferred embodiment, the expanded key array has 12 words (because there are 12 rounds of cipher processing). Thus, 3 invocations of the SHA-1 function are required in order to generate a sufficient number of bits. (Since this is a not multiple of 5, 3 words of the final invocation are discarded.) Preferably, each invocation passes a different integer value, to be used along with the master key K, to further randomize the generated values. For the first invocation, the preferred embodiment concatenates the master key, the integer 1, and the master key again. This is then passed as the seed to the SHA-1 function. In the second and third invocations, the integers 2 and 3 are used, respectively, in the concatenated value that is passed. Alternatively, some other strategy for choosing the integer to be used on each invocation can be used. For example, a different integer can be selected using a formula, or an integer could be chosen at random, etc.

S-BOX SETUP PHASE

The S-box used by the preferred embodiment is generated using an input key. The S-box setup phase may be performed immediately prior to the encryption phase when encrypting a particular input file, or the S-box may be generated well in advance of the encryption. In the latter case, the S-box would be stored for later use, in order to minimize the time required to encrypt a data file. Regardless of when the S-box is generated, the generation process follows the same steps.

The S-box used in the preferred embodiment is accessed using 6 sequential bits from one of the data words being encrypted. Preferably, the low-order 6 bits are used. When 6 bits are used as an index, the S-box has 64 entries (one for each of 26 different index values). Each entry is 32 bits long. Any pseudo-random function may be used to generate the S-box entries, in a similar manner to that used for subkey generation. In the preferred embodiment, the SHA-1 function is used for S-box generation as well as subkey generation. Since 64 32-bits words are required, and each invocation returns 5 32-bit words, 13 invocations of SHA-1 are required (where the extra 1 word from the final invocation is discarded). A technique such as that used in subkey generation to vary the value passed as the seed, whereby an integer was concatenated between 2 instances of the master key, is the preferred approach to S-box generation as well. The 13 integers used in this process should be different from the integers used in subkey generation. For example, where the integers 1–3 were used for subkeys, the integers 4–16 may be used for the S-box.

Considering the S-box as a table of 64 rows, each row corresponding to one of the $2^6$=64 values used to index into the S-box, the following expression specifies which bits of the S-box are located using a specific index value:

$$\text{row } i = S[i] = S[32(i-1) \ldots (32i-1)] \text{ where } 1 \leq i \leq 64$$

The S-box of the preferred embodiment overcomes the performance penalty typically associated with S-box lookups, and minimizes the time required to generate the S-box, due to its small size. (The S-box as described contains only 2,048 bits.) The security of the cipher is not comprised by having only a small number of entries, however, because those entries are used within the expansion box (as described below).

EXPANSION BOX

A key-dependent expansion box is used during each round of encryption, and the same expansion box is used during each round of decryption (thus avoiding the need to invert the functions within the box, even though the functions are invertible). The expansion box is a function implemented using a modified unbalanced Type-i Feistel network, whereby a 32-bit input is transformed repeatedly, and a 96-bit output results. In the preferred embodiment, this UFN comprises a set-up round followed by eight ciphering rounds. This network differs from a traditional Feistel Type-1 network because a word may be used to modify any of the other words of the block, not just the next sequential word of the block. Instead, according to the preferred embodiment, an input data word is added to the subkey for the round inside the expansion box, and then the result is used by the expansion function to create 3 different components. Each round consists of 3 subrounds. A different one of the 3 components is used in a subround of each round, to modify one of the other components. FIG. 3 shows the data word, denoted as E0, being added to the round subkey E1, and the result being split replicated across the three lines of the network in this manner to form the initial 3 components. (FIG. 4 shows which data word and subkey are used for each invocation, according to the preferred embodiment. These input values are also given below, in the encryption equations that invoke the expansion function.)

The expansion function can be generally described by the following expression:

$$F(x) = x_1^8 . x_2^8 . x_3^8$$

That is, from a 32-bit input value "x", a 96-bit output value is created by concatenating the 32-bit components $x_1^8$, $x_2^8$, and $x_3^8$ which result from operation of the function. The intermediate component values can be denoted as $x_j^i$, where j={1, 2, 3} and i={0, 1, ... 8}. As discussed, the input value x is the result of adding a data word to the subkey for this round.

A single key-dependent S-box is used in the preferred embodiment of this modified Type-1 function. As previously discussed, the S-box takes a 6-bit input, and returns a 32-bit output. The transformation equations described herein denote with "S(x)" the result of applying the S-box S to the least significant 6 bits of x.

In the preferred embodiment, the value of each component that is changed during an expansion round, using an invertible function such as addition or exclusive OR, is rotated after the invertible function is performed.

The setup round (Round 0) and the 8 rounds of expansion box function will now be described, using mathematical equations to define the function of each round and subround. These equations correspond to the function of the network diagram in FIG. 3.

Round 0: $x_2^0 = ROT_3(x)$
$x_3^0 = ROT_{13}(x)$
$x_1^0 = x \oplus x_2^0 \oplus x_3^0$
Round 1: $x_1^1 = x_1^0$
$x_2^1 = ROT_{17}(x_2^0 + S(x_1^0))$
$x_3^1 = x_3^0$
Round 2: $x_1^2 = x_1^1$
$x_2^2 = x_2^1$
$x_3^2 = ROT_{24}(x_3^1 + S(x_2^1))$
Round 3: $x_1^3 = ROT_{14}(x_1^2 \oplus S(x_3^2))$
$x_2^3 = x_2^2$
$x_3^3 = x_3^0$
Round 4: $x_1^4 = x_1^3$
$x_2^4 = ROT_6(x_2^3 \oplus S(x_1^3))$
$x_3^4 = x_3^0$
Round 5: $x_1^5 = x_1^4$
$x_2^5 = x_2^4$
$x_3^5 = ROT_6 (x_3^4 \oplus S(x_2^4))$
Round 6: $x_1^6 = ROT_9(x_1^5 + S(x_3^5))$
$x_2^6 = x_2^5$
$x_3^6 = x_3^5$
Round 7: $x_1^7 = x_1^6$
$x_2^7 = ROT_{12}(x_2^6 \oplus S(x_1^6))$
$x_3^7 = x_3^6$ Round 8: $x_1^8 = x_1^7$
$x_2^8 = x_2^7$
$x_3^8 = ROT_{17}(x_3^7 + S(x_2^7))$ In setup round 0, the input is one of the data words, $M_i^j$. That data word is added to the subkey for the round, creating the input value x. While addition is used in the preferred embodiment, any other length-preserving invertible function could be used without deviating from the inventive concepts of the present invention. From the result of this addition, the 3 components are created. Components 2 and 3 are created first. Component 2 is created from this input value, x, by rotating that value 3 bit positions to the right. Component 3 is created similarly, using 13 positions of rotation. Component 1 is then created, by exclusive OR'ing the input word x with the values of components 2 and 3.

After the setup rounds, rounds 1 through 8 are similar to each other in operation, with changes in which of the 2 components are unchanged per round, which of the 3 components is used in creating a new value for the 1 changed component, whether addition or exclusive OR is used prior to the S-box lookup, and the amount of rotation used.

In round 1, components 1 and 3 are left unchanged. Component 2 becomes the value obtained after rotating the result of an addition 17 positions to the right, where the operands of the addition are component 1 from round 0 and the value retrieved in an S-box lookup using component 1 from round 0.

In round 2, components 1 and 2 are left unchanged. Component 3 becomes the value obtained after rotating the result of an addition 24 positions to the right, where the operands of the addition are component 2 from round 1 and the value retrieved in an S-box lookup using component 1 from round 1.

In round 3, components 2 and 3 are left unchanged. Component 1 becomes the value obtained after rotating the result of an exclusive OR 14 positions to the right, where the operands of the exclusive OR are component 1 from round 2 and the value retrieved in an S-box lookup using component 3 from round 2.

In round 4, components 1 and 3 are left unchanged. Component 2 becomes the value obtained after rotating the result of an exclusive OR 6 positions to the right, where the operands of the exclusive OR are component 2 from round 3 and the value retrieved in an S-box lookup using component 1 from round 3.

In round 5, components 1 and 2 are left unchanged. Component 3 becomes the value obtained after rotating the result of an exclusive OR 6 positions to the right, where the operands of the exclusive OR are component 3 from round 4 and the value retrieved in an S-box lookup using component 2 from round 4.

In round 6, components 2 and 3 are left unchanged. Component 1 becomes the value obtained after rotating the result of an addition 9 positions to the right, where the operands of the addition are component 1 from round 5 and the value retrieved in an S-box lookup using component 3 from round 5.

In round 7, components 1 and 3 are left unchanged. Component 2 becomes the value obtained after rotating the result of an exclusive OR 12 positions to the right, where the operands of the exclusive OR are component 2 from round 6 and the value retrieved in an S-box lookup using component 1 from round 6.

In round 8, components 1 and 2 are left unchanged. Component 3 becomes the value obtained after rotating the result of an addition 17 positions to the right, where the operands of the addition are component 3 from round 7 and the value retrieved in an S-box lookup using component 2 from round 7.

After round 8, the 3 components are concatenated. The result is then used in the modified Type-3 cipher round from which the expansion function was invoked.

ENCRYPTION PHASE

Encryption is performed in multiple stages. Each stage comprises N rounds, each having N subrounds, where N is the number of components in the data word, M. In the preferred embodiment, N=4, and 3 full stages are used, for a total of 12 rounds of cipher processing, as diagrammed in FIG. 4. According to the preferred embodiment, a stage affects each word of the block. As shown in FIG. 4, these stages are implemented such that there are 2 full stages, preceded by a half stage and followed by a half stage. Each of these 12 rounds is performed for each input block of plaintext. FIG. 4 shows that from the plaintext words (referred to as $M_1$ through $M_4$ in FIG. 4), application of the 12 rounds creates the output block of ciphertext (referred to as c[0] through c[3] in FIG. 4). As previously stated, the number of words per block used by the present invention is variable: four-word blocks are shown in FIG. 4 as an illustrative block size. More rounds are required if the data word is divided into more than 4 components; further, the number of stages can be increased from 3 without deviating from the inventive concepts of the present invention. For example, the operations of the first stage could be repeated following operation of the second stage.

After round number i, $1 \leq i \leq 12$, the intermediate message blocks are denoted $M_1^i$, $M_2^i$, $M_3^i$, and $M_4^i$. By convention, the plaintext word $M_j$ is also called $M_j^0$. The ciphertext is therefore denoted as $M_1^{12}$, $M_2^{12}$, $M_3^{12}$, and $M_4^{12}$.

The preferred embodiment is described using a general approach to subkey usage, whereby subkeys are accessed from the expanded key array in sequential order. Alternative approaches to selecting subkeys may be used without deviating from the inventive concepts of the present invention. For example, instead of using each subkey sequentially from the key array, an index might be used to cause selection of every other subkey, or every third subkey, or perhaps generating an index number randomly. When the subkeys are chosen from a greater range of indices in this manner, then the size of the subkey array generated in key setup may need to expand accordingly; or, the array size might be retained, with the subkeys within that array possibly being re-used. (Alternatively, an algorithm can be constructed that uses each of the 12 subkeys, in a non-sequential order, without reuse of individual keys.) In the preferred embodiment, the following expression specifies which bits of the expanded key array are used for a specific subkey:

subkey $K_i = E[32(i-1) \ldots (32i-1)]$ where i is a round number, $1 \leq i \leq 12$ It will be obvious to one of ordinary skill in the art that any alterations to the preferred embodiment subkey selection for encryption must be reflected also in the decryption stages.

The preferred embodiment of the encryption phase will now be described in detail. The 12 rounds used for the modified Type-3 Feistel can be expressed using the following mathematical expressions to define the function of each round and subround.

Round 1: $M_2^1 = M_2^0 \oplus F_2(M_1^0 + K^1)$
$M_3^1 = M_3^0 \oplus F_3(M_1^0 + K^1)$
$M_4^1 = M_4^0 + F_1(M_1^0 + K^1)$
$M_1^1 = M_1^0 + M_4^1$
Round 2: $M_1^2 = ROT_1(M_1^1 \oplus F_2(M_2^1 + K^2))$
$M_3^2 = ROT_1(M_3^1 + F_1(M_2^1 + K^2))$
$M_4^2 = ROT_1(M_4^1 \oplus F_3(M_2^1 + K^2))$
$M_2^2 = ROT_1(M_2^1 + M_3^1 + F_1(M_2^1 + K^2))$
Round 3: $M_1^3 = M_1^2$
$M_2^3 = M_2^2 + F_1(M_1^2 + K^3)$
$M_3^3 = M_3^2 \oplus F_2(M_1^2 + K^3)$
$M_4^3 = M_4^2 \oplus F_3(M_1^2 + K^3)$
Round 4: $M_1^4 = M_1^3 \oplus F_3(M_2^3 + K^4)$
$M_2^4 = M_2^3$
$M_3^4 = M_3^3 + F_1(M_2^3 + K^4)$
$M_4^4 = M_4^3 \oplus F_2(M_2^3 + K^4)$
Round 5: $M_1^5 = M_1^4 \oplus F_2(M_3^4 + K^5)$
$M_2^5 = M_2^4 \oplus F_3(M_3^4 + K^5)$
$M_3^5 = M_3^4$
$M_4^5 = M_4^4 + F_1(M_3^4 + K^5)$
Round 6: $M_1^6 = ROT_1(M_1^5 + F_1(M_4^5 + K^6))$
$M_2^6 = ROT_1(M_2^5 \oplus F_2(M_4^5 + K^6))$
$M_3^6 = ROT_1(M_3^5 \oplus F_3(M_4^5 + K^6))$
$M_4^6 = ROT_1(M_4^5)$
Round 7: $M_1^7 = M_1^6$
$M_2^7 = M_2^6 \oplus F_3(M_1^6 + K^7)$
$M_3^7 = M_3^6 \oplus F_2(M_1^6 + K^7)$
$M_4^7 = M_4^6 + F_1(M_1^6 + K^7)$
Round 8: $M_1^8 = M_1^7 + F_1(M_2^7 + K^8)$
$M_2^8 = M_2^7$
$M_3^8 = M_3^7 \oplus F_3(M_2^7 + K^8)$
$M_4^8 = M_4^7 \oplus F_2(M_2^7 + K^8)$
Round 9: $M_1^9 = M_1^8 \oplus F_2(M_3^8 + K^9)$
$M_2^9 = M_2^8 + F_1(M_3^8 + K^9)$
$M_3^9 = M_3^8$
$M_4^9 = M_4^8 \oplus F_3(M_3^8 + K^9)$
Round 10: $M_1^{10} = ROT_1(M_1^9 \oplus F_3(M_4^9 + K^{10}))$
$M_2^{10} = ROT_1(M_2^9 \oplus F_2(M_4^9 + K^{10}))$
$M_3^{10} = ROT_1(M_3^9 \oplus F_1(M_4^9 + K^{10}))$
$M_4^{10} = ROT_1(M_4^9)$
Round 11: $M_3^{11} = M_3^{10} + M_2^{10}$
$M_1^{11} = M_1^{10} \oplus F_3(M_3^{11} + K^{11})$
$M_2^{11} = M_2^{10} \oplus F_2(M_3^{11} + K^{11})$
$M_4^{11} = M_4^{10} \oplus F_1(M_3^{11} + K^{11})$
Round 12: $M_4^{12} = M_4^{11} + M_1^{11}$
$M_1^{12} = M_1^{11} \oplus F_2(M_4^{12} + K^{12})$
$M_2^{12} = M_2^{11} + F_1(M_4^{12} + K^{12})$
$M_3^{12} = M_3^{11} \oplus F_3(M_4^{12} + K^{12})$ As an example of the operation of the round function, consider the first round, with its 4 subrounds. In this round, the value for component $M_1^1$ is created last, as can be seen by referring to FIG. 4. (FIG. 4 is to be read from top to bottom, proceeding down all the 4 lines of the network, for encryption rounds.) Thus, values for the other 3 components are described first in the equations used for this round. The expansion function, F, is invoked with the input data word $M_1^0$ and the subkey $K^1$ for this round.

As previously discussed, F is a 32-to-96 bit expansion function, which begins by adding its 2 32-bit operands, processes the resulting value, and finally returns a 96-bit output. In the equations for the cipher processing, these 96 bits are referred to as 3 separate 32-bit values, $F_1$, $F_2$, and $F_3$ (where $F(x)=F_1 \cdot F_2 \cdot F_3$). After the 96 bits are divided into these 3 values, each is used during a different subround. Thus, in the 12 rounds of cipher processing of the preferred embodiment, F is invoked 12 times, generating 36 different 32-bit words that are used in 36 of the total 48 subrounds.

After invoking F in round 1, $M_2^1$ is created by exclusive OR'ing the value of $M_2^0$ (that is, the second input data word) with the second 32-bit output of the expansion function, $F_2$. $M_3^1$ is created by exclusive OR'ing the value of $M_3^0$ with the third 32-bit output of F, and $M_4^1$ is created by adding $M_4^0$ to the first 32-bit output of F. Finally, the value of $M_1^1$ is created by adding $M_1^0$ to the newly-created value of $M_4^1$.

The equations for the subrounds have been presented generally in numerical order of the data word affected for that subround, except where the feedback operations required a different order. The order in which the operations are depicted in FIG. 4 does not correspond exactly to the order of the equations: for drawing convenience, FIG. 4 sometimes shows the operations in different order so that the 3 output lines of the expansion box (shown as arrows leaving the square box) do not cross each other. Because the 3 subrounds which use the expansion box outputs are independent of each other, the order of these subrounds is irrelevant: either the order shown in the equations, or the order shown by traversing FIG. 4 strictly from top to bottom, may be used. Where the subround equations do not proceed in sequential order of j (that is, the equation resulting in an updated data word $M_j^i$, $1 \leq j \leq 4$), then the order of processing that subround is significant and must not be altered. The location of that subround within the equations for the round, and within FIG. 4, is identical. (This order is also preserved in the decryption equations.)

Figure 4:
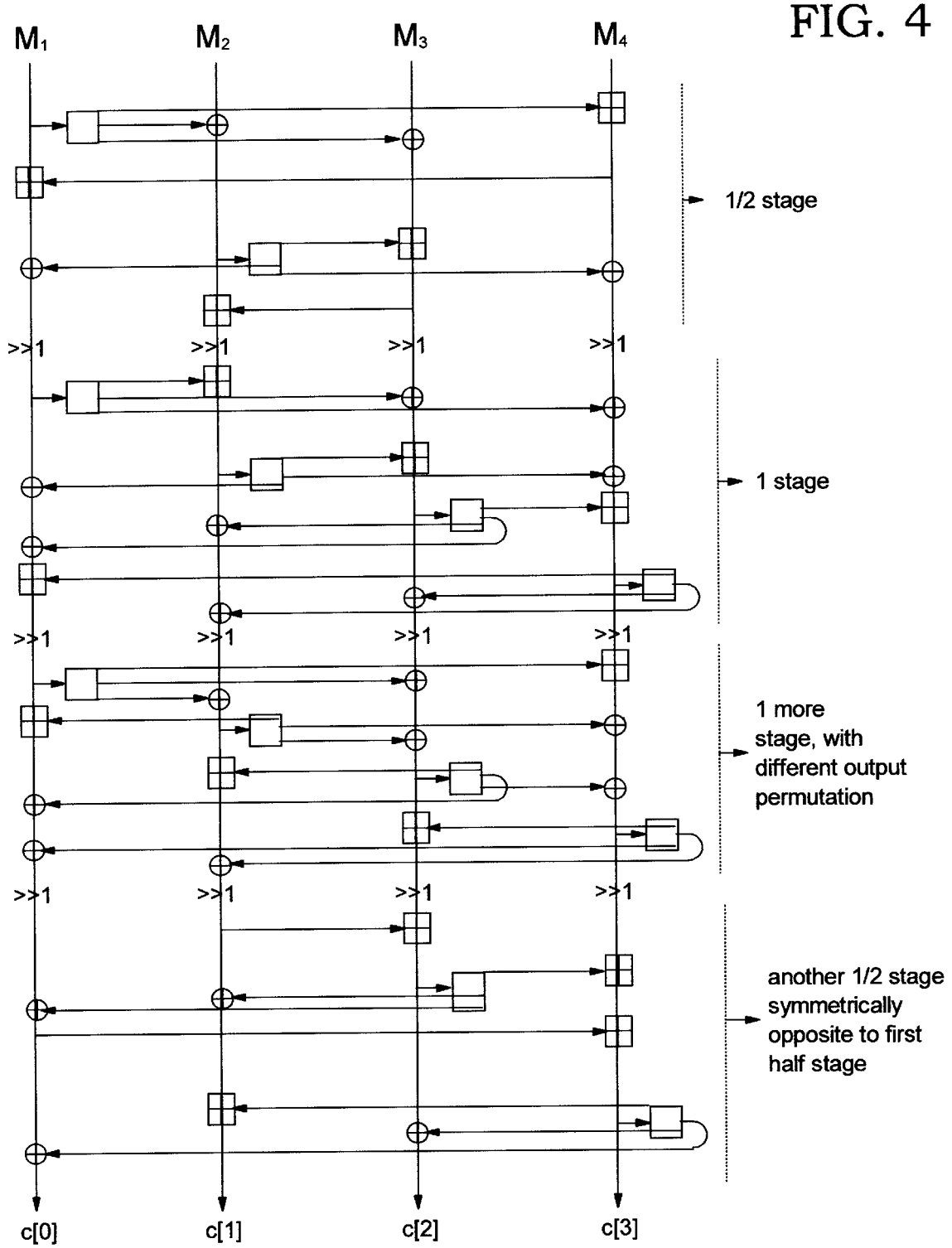
FIG. 4 shows a flow diagram of the process used in the preferred embodiment to encrypt a block of data with the modified Feistel Type-3 network.

As will be obvious to one of ordinary skill in the art, referring to the subround equations and FIG. 4, the processing of the remaining 11 rounds is very similar, with several differences. A different subkey is used in each round, as discussed. Which of the 4 data words is passed to the expansion function changes from round to round, as does the order in which the expansion output words $F_j$ are used for the subrounds. In some rounds, the data word that does not get processed with one of the expanded words simply drops down to the next round unchanged (for example, $M_1^2$ becomes $M_1^3$ in round 3), while in other rounds there is a feedback addition operation performed for that data word. The three subrounds using the expanded data words use 2 exclusive OR operations, and 1 addition operation, in the preferred embodiment. (Other invertible operations could be used for these subrounds without deviating from the inventive concepts of the present invention. For example, 1 exclusive OR and 2 additions could be used.) Further, a rotation operation is performed at the end of each subround in selected rounds.

Specifically, rotation is used at the end of rounds 2, 6, and 10. This choice of rounds corresponds to the end of the stages (a half-stage and 2 full stages) depicted in FIG. 4. This rotation serves to increase the mixing properties of the cipher, using a very cheap operation (in terms of processing time and logic complexity).

Feedback operations are used in rounds 1 (for the new value of $M_1^1$), 2 (for the new value of $M_2^2$), 11 (for the new value of $M_3^{11}$), and 12 (for the new value of $M_4^{12}$. These rounds were chosen to be at the beginning of the cipher, and the end of the cipher. Using these feedback subrounds, with the simple operation of addition, speeds up the mixing of the bits while adding a very small amount of additional processing time and logic complexity to the cipher.

In typical Feistel networks that use an expansion function, the function inside the expansion box is independent of the function outside the box (that is, the main cipher processing). However, in the preferred embodiment of this invention, the function of the main cipher processing and the expansion box processing have been defined to work together in an optimal way.

DECRYPTION

Decryption is simply the reverse of encryption, running the same operations in the reverse order, inverting the encryption operations. Referring to the diagrams in FIGS. 3 and 4, the decryption process corresponds to using the operations shown in FIG. 4, with these changes to FIG. 4 only: (1) the order of the rounds and their subrounds is reversed (that is, the operations of FIG. 4 are processed from the bottom of the diagrams towards the top); (2) each addition operation is replaced by a subtraction operation; (3) each rotation operation rotates to the left instead of to the right; (4) superscripts used for the component value on the left of the equations, j, and its corresponding superscript on the right, j−1, are reversed; and (5) the inverse rotation operations are moved into the next-preceding subround. There are no changes required in the preferred embodiment to use the network of FIG. 3 during decryption, because as previously stated, this expansion box implements a forward function. (In an alternative embodiment, the expansion function could be inverted, replacing all addition operations with subtraction, and all right rotation with left rotation, and proceeding from the bottom to the top.)

It will be obvious to one of ordinary skill in the art how to make the inversions described above: for ease of understanding, the resulting equations are shown below. Further, it will be obvious that any changes made to the preferred embodiment of the encryption phase (according to the alternatives discussed herein, for example changing the block size) must be reflected by corresponding changes to the decryption phase.

Decryption Round 1: $M_3^{11}=M_3^{12} \oplus F_3(M_4^{12}+K^{12})$
$M_2^{11}=M_2^{12}-F_1(M_4^{12}+K^{12})$
$M_1^{11}=M_1^{12} \oplus F_2(M_4^{12}+K^{12})$
$M_4^{11}=M_4^{12}-M_1^{11}$ Decryption Round 2: $M_4^{10}=M_4^{11}-F_1(M_3^{11}+K^{11})$
$M_2^{10}=M_2^{11} \oplus F_2(M_3^{11}+K^{11})$
$M_1^{10}=M_1^{11} \oplus F_3(M_3^{11}+K^{11})$
$M_3^{10}=M_3^{11}-M_2^{10}$ Decryption Round 3: $M_4^9=IROT_1(M_4^{10})$
$M_3^9=IROT_1(M_3^{10})-F_1(M_4^9+K^{10})$
$M_2^9=IROT_1(M_2^{10}) \oplus F_2(M_4^9+K^{10})$
$M_1^9=IROT_1(M_1^{10}) \oplus F_3(M_4^9+K^{10})$ Decryption Round 4: $M_4^8=M_4^9 \oplus F_3(M_3^8+K^9)$
$M_3^8=M_3^9$
$M_2^8=M_2^9-F_1(M_3^8+K^9)$
$M_1^8=M_1^9 \oplus F_2(M_3^8+K^9)$ Decryption Round 5: $M_4^7=M_4^8 \oplus F_2(M_2^7+K^8)$
$M_3^7=M_3^8 \oplus F_3(M_2^7+K^8)$
$M_2^7=M_2^8$
$M_1^7=M_1^8-F_1(M_2^7+K^8)$ Decryption Round 6: $M_4^6=M_4^7-F_1(M_1^6+K^7)$
$M_3^6=M_3^7 \oplus F_2(M_1^6+K^7)$
$M_2^6=M_2^7 \oplus F_3(M_1^6+K^7)$
$M_1^6=M_1^7$ Decryption Round 7: $M_4^5=IROT_1(M_4^6)$
$M_3^5=IROT_1(M_3^6) \oplus F_3(M_4^5+K^6)$
$M_2^5=IROT_1(M_2^6) \oplus F_2(M_4^5+K^6)$
$M_1^5=IROT_1(M_1^6)-F_1(M_4^5+K^6)$
Decryption Round 8: $M_4^4=M_4^5-F_1(M_3^4+K^5)$
$M_3^4=M_3^5$
$M_2^4=M_2^5 \oplus F_3(M_3^4+K^5)$
$M_1^4=M_1^5 \oplus F_2(M_3^4+K^5)$
Decryption Round 9: $M_4^3=M_4^4 \oplus F_2(M_2^3+K^4)$
$M_3^3=M_3^4-F_1(M_2^3+K^4)$
$M_2^3=M_2^4$
$M_1^3=M_1^4 \oplus F_3(M_2^3+K^4)$
Decryption Round 10: $M_4^2=M_4^3 \oplus F_3(M_1^2+K^3)$
$M_3^2=M_3^3 \oplus F_2(M_1^2+K^3)$
$M_2^2=M_2^3-F_1(M_1^2+K^3)$
$M_1^2=M_1^3$
Decryption Round 11: $M_2^1 IROT_1(M_2^2)-M_3^2$
$M_4^1 IROT_1(M_4^2) \oplus F_3(M_2^1+K^2)$
$M_3^1 IROT_1(M_3^2)-F_1(M_2^1+K^2)$
$M_1^1 IROT_1(M_1^2) \oplus F_2(M_2^1+K^2)$
Decryption Round 12: $M_1^0=M_1^1-M_4^1$
$M_4^0=M_4^1-F_1(M_1^0-K^1)$
$M_3^0=M_3^1 \oplus F_3(M_1^0-K^1)$
$M_2^0=M_2^1 \oplus F_2(M_1^0-K^1)$ As an example of the processing of a decryption round, consider decryption round 1 (which corresponds to inverting encryption round 12). For this round, the expansion function is invoked using word 4 of the encrypted data, $M_4^{12}$, and the last subkey, $K^{12}$, of the expanded key array. These 2 values are added together inside the expansion box. In the first subround, a new value for $M_3^{11}$ is created by exclusive OR'ing the third word of the encrypted data, $M_3^{12}$, with the third 32-bit output of the expansion function. In the second subround, a new value for $M_2^{11}$ is created by subtracting the first 32-bit output of the expansion function from the second word of the encrypted data, $M_2^{12}$. Subround 3 creates a new value for $M_1^{11}$ by exclusive OR'ing the first word of the encrypted data, $M_1^{12}$, with the second 32-bit output of the expansion function. Finally, a new value for $M_4^{11}$ is created by reversing the feedback used in encryption, so that the value of encrypted data word $M_1^{11}$ is subtracted from the value of encrypted data word $M_4^{12}$.

It will be obvious to one of ordinary skill in the art that the remaining 11 rounds of decryption process in a similar manner to the first. The specific function of each round and subround can be understood by reference to the decryption equations, and equivalently by referring to the network in FIG. 4, reading that figure from the bottom to the top and making the inversions of addition to subtraction, and right rotation to left rotation.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A method of encrypting an input file comprising a plurality of blocks using a symmetric key block cipher by performing a modified Type-3 Feistel network process on each block of the input file, wherein the modified Type-3 Feistel network process comprises a Type-3 Feistel network process which is augmented to modify a block used as input to an expansion function, further comprising the steps of:
   dividing each input block from the input file into a set of input words of equal length, the set having a cardinality greater than 2; and
   performing 3 or more transformation stages on each set of input words to transform the input words into output words, wherein each of the transformation stages comprises a plurality of rounds, further comprising the steps of:
   arithmetically combining a round-specific subkey for a current transformation round of the modified Type-3 Feistel network process with a selected output word from a next-prior transformation round of the modified Type-3 Feistel network process, or with a selected one of the input words for an initial transformation round, yielding an expansion box input word;
   invoking an expansion function using the expansion box input word as an input parameter, where the expansion function comprises a modified Type-1 unbalanced Feistel network process, wherein the modified Type-1 unbalanced Feistel network process comprises an unbalanced Type-1 Feistel network process which is modified to transform segments of the input parameter in a manner that is not limited to transforming a particular segment using only its next-prior segment, further comprising the steps of:
   expanding the input parameter using a plurality of simple transformations;
   dividing the expanded input parameter into a number of input segments of equal length, the number being greater than 2;
   performing 3 or more expansion function rounds on the input segments, where each expansion function round transforms a particular one of the input segments using a substitution-box (S-box) lookup result which is arithmetically combined with a segment value created by a next-prior expansion function round, or with one of the input segments for an initial expansion function round; and
   returning an expansion box output value to the invoking modified Type-3 Feistel network process, where the expansion box output value results from performing the expansion function rounds;
   dividing the expansion box output value into a number of parts, where the number of parts is identical to the number of input segments created from the expanded input parameter and is 1 less than the cardinality of the set of input words;
   arithmetically combining each of the parts with a particular one of the input words for the initial transformation round, or with a particular one of the output words from a next-prior transformation round otherwise;
   in selected ones of the transformation rounds, applying a feedback operation to a remaining one of the input words which is not thus arithmetically combined, and leaving the remaining one unchanged in remaining transformation rounds, wherein the arithmetically combining and the selectively applying feedback or leaving unchanged yields the output words of the transformation round; and
   performing a bitwise rotation on the output words after particular ones of the transformation rounds to further transform the output words.

2. The method according to claim 1, wherein a length of the round-specific subkeys, a length of the input blocks, a number of the transformation rounds, and a number of expansion function rounds is fixed in a particular embodiment of the method.

3. The method according to claim 1, wherein one or more of the steps is embodied in a hardware chip.

4. The method according to claim 1, wherein:
the arithmetic combination used in the expansion function round transformation comprises performing an invertible function; and further comprising:
performing a bit-wise rotation of a result of the invertible function.

5. The method according to claim 4, wherein the invertible function is one of (1) an addition operation or (2) an exclusive OR operation.

6. The method according to claim 4, wherein the bit-wise rotation is a right bit-wise rotation.

7. The method according to claim 1, wherein the S-box is generated using a pseudorandom function.

8. The method according to claim 1, wherein the round-specific subkeys are generated from an input key using a first pseudorandom function, and wherein a distinct round-specific subkey is generated for each transformation round.

9. A method of carrying out a symmetric key block cipher on each input block of an input file using a computer, comprising the steps of:
performing a modified Type-3 Feistel network process on each input block, wherein the modified Type-3 Feistel network process modifies each of a plurality of segments of the input block during each of a plurality of Type-3 ciphering rounds; and
performing a key-dependent invocation, during each of the Type-3 ciphering rounds, of a modified unbalanced Type-1 Feistel network process, wherein the modified unbalanced Type-1 Feistel network process comprises a forward expansion function having a plurality of Type-1 ciphering rounds, and wherein each of the Type-1 ciphering rounds uses a selected one of a plurality of data segments operated on by the forward expansion function as an input to a substitution-box lookup operation, wherein a result of the substitution-box lookup operation is then used to modify any other one of the plurality of data segments.

10. The method according to claim 9, wherein the key-dependent invocation further comprises adding a round-specific subkey to a selected segment being operated on by the Type-3 ciphering round, and invoking the forward expansion function using a result of the addition as an input parameter.

11. The method according to claim 9, wherein the forward expansion function expands a single input segment passed as an input parameter of the key-dependent invocation into 3 output segments.

12. The method according to claim 11, wherein each input block is divided such that the plurality of segments comprises 4 segments of equal length and wherein each Type-3 ciphering round operates on these 4 segments, a selected Type-3 ciphering round further comprising the steps of:
arithmetically combining each of the 3 output segments of a round-specific invocation of the forward expansion function with an interim value of 3 distinct ones of the 4 segments, yielding new values for the 3 segments;
leaving unchanged the fourth segment in selected ones of the Type-3 ciphering rounds, and modifying the fourth segment by a simple arithmetic operation in remaining ones of the Type-3 ciphering rounds, yielding a new value for fourth segment; and
using the new values for the 3 segments and new value for the fourth segment as input values to a next-sequential round of Type-3 ciphering in particular ones of the Type-3 ciphering rounds, and performing a bitwise rotation on the new values for the 3 segments and new value for the fourth segment for remaining ones of the Type-3 ciphering rounds to create the input values to the next-sequential round of Type-3 ciphering.

13. The method according to claim 12, wherein the simple arithmetic operation is one of (1) an addition operation or (2) an exclusive OR operation, and wherein the modifying of the fourth segment thereby operates as a feedback operation.

14. The method according to claim 12, wherein the step of arithmetically combining further comprises performing one of (1) an addition operation or (2) an exclusive OR operation.

15. The method according to claim 9, wherein using the result of the substitution-box lookup operation to modify any other one of the plurality of data segments further comprises:
one of (1) adding the result or (2) exclusive-ORing the result with the other one; and
then performing a bitwise rotation of an output of the adding or exclusive-ORing.

16. The method according to claim 9, wherein the cipher supports a variable number of the Type-3 ciphering rounds and a variable number of the Type-1 ciphering rounds, a variable length of the input blocks, and uses a variable length subkey in the key-dependent invocation.

17. The method according to claim 9, wherein at least one of the steps is embodied in hardware.

18. A system for carrying out a symmetric key block cipher on each input block of an input file using a computer, comprising:
means for performing a modified Type-3 Feistel network process on each input block, wherein the modified Type-3 Feistel network process modifies each of a plurality of segments of the input block during each of a plurality of Type-3 ciphering rounds; and
means for performing a key-dependent invocation, during each of the Type-3 ciphering rounds, of a modified unbalanced Type-1 Feistel network process, wherein the modified unbalanced Type-1 Feistel network process comprises a forward expansion function having a plurality of Type-1 ciphering rounds, and wherein each of the Type-1 ciphering rounds uses a selected one of a plurality of data segments operated on by the forward expansion function as an input to a substitution-box lookup operation, wherein a result of the substitution-box lookup operation is then used to modify any other one of the plurality of data segments.

19. The system according to claim 18, wherein the key-dependent invocation further comprises means for adding a round-specific subkey to a selected segment being operated on by the Type-3 ciphering round, and means for invoking the forward expansion function using a result of the addition as an input parameter.

20. The system according to claim 18, wherein the forward expansion function expands a single input segment passed as an input parameter of the key-dependent invocation into 3 output segments.

21. The system according to claim 20, wherein each input block is divided such that the plurality of segments comprises 4 segments of equal length and wherein each Type-3 ciphering round operates on these 4 segments, a selected Type-3 ciphering round further comprising:

means for arithmetically combining each of the 3 output segments of a round-specific invocation of the forward expansion function with an interim value of 3 distinct ones of the 4 segments, yielding new values for the 3 segments, means for leaving unchanged the fourth segment in selected ones of the Type-3 ciphering rounds, and modifying the fourth segment by a simple arithmetic operation in remaining ones of the Type-3 ciphering rounds, yielding a new value for fourth segment, and means for using the new values for the 3 segments and new value for the fourth segment as input values to a next-sequential round of Type-3 ciphering in particular ones of the Type-3 ciphering rounds, and performing a bitwise rotation on the new values for the 3 segments and new value for the fourth segment for remaining ones of the Type-3 ciphering rounds to create the input values to the next-sequential round of Type-3 ciphering.

22. The system according to claim 21, wherein the simple arithmetic operation is one of (1) an addition operation or (2) an exclusive OR operation, and wherein the modifying of the fourth segment thereby operates as a feedback operation.

23. The system according to claim 21, wherein the means for arithmetically combining further comprises means for performing one of (1) an addition operation or (2) an exclusive OR operation.

24. The system according to claim 18, wherein the means for using the result of the substitution-box lookup operation to modify any other one of the plurality of data segments further comprises:

means for performing one of (1) adding the result or (2) exclusive-ORing the result with the other one; and means for then performing a bitwise rotation of an output of the means for performing.

25. The system according to claim 18, wherein the cipher supports a variable number of the Type-3 ciphering rounds and a variable number of the Type-1 ciphering rounds, a variable length of the input blocks, and uses a variable length subkey in the key-dependent invocation.

26. The system according to claim 18, wherein at least one of the means is embodied in hardware.

27. A computer program product for carrying out a symmetric key block cipher on each input block of an input file using a computer, the computer program product embodied on a computer-readable medium and comprising:

computer-readable program code means for performing a modified Type-3 Feistel network process on each input block, wherein the modified Type-3 Feistel network process modifies each of a plurality of segments of the input block during each of a plurality of Type-3 ciphering rounds; and computer-readable program code means for performing a key-dependent invocation, during each of the Type-3 ciphering rounds, of a modified unbalanced Type-1 Feistel network process, wherein the modified unbalanced Type-1 Feistel network process comprises a forward expansion function having a plurality of Type-1 ciphering rounds, and wherein each of the Type-1 ciphering rounds uses a selected one of a plurality of data segments operated on by the forward expansion function as an input to a substitution-box lookup operation, wherein a result of the substitution-box lookup operation is then used to modify any other one of the plurality of data segments.

28. The computer program product according to claim 27, wherein the key-dependent invocation further comprises computer-readable program code means for adding a round-specific subkey to a selected segment being operated on by the Type-3 ciphering round, and computer-readable program code means for invoking the forward expansion function using a result of the addition as an input parameter.

29. The computer program product according to claim 27, wherein the forward expansion function expands a single input segment passed as an input parameter of the key-dependent invocation into 3 output segments.

30. The computer program product according to claim 29, wherein each input block is divided such that the plurality of segments comprises 4 segments of equal length and wherein each Type-3 ciphering round operates on these 4 segments, a selected Type-3 ciphering round further comprising:

computer-readable program code means for arithmetically combining each of the 3 output segments of a round-specific invocation of the forward expansion function with an interim value of 3 distinct ones of the 4 segments, yielding new values for the 3 segments;

computer-readable program code means for leaving unchanged the fourth segment in selected ones of the Type-3 ciphering rounds, and modifying the fourth segment by a simple arithmetic operation in remaining ones of the Type-3 ciphering rounds, yielding a new value for fourth segment; and computer-readable program code means for using the new values for the 3 segments and new value for the fourth segment as input values to a net-sequential round of Type-3 ciphering in particular ones of the Type-3 ciphering rounds, and performing a bitwise rotation on the new values for the 3 segments and new value for the fourth segment for remaining ones of the Type-3 ciphering rounds to create the input values to the next-sequential round of Type-3 ciphering.

31. The computer program product according to claim 30, wherein the simple arithmetic operation is one of (1) an addition operation or (2) an exclusive OR operation, and wherein the modifying of the fourth segment thereby operates as a feedback operation.

32. The computer program product according to claim 30, wherein the computer-readable program code means for arithmetically combining further comprises computer-readable program code means for performing one of (1) an addition operation or (2) an exclusive OR operation.

33. The computer program product according to claim 27, wherein the computer-readable program code means for using the result of the substitution-box lookup operation to modify any other one of the plurality of data segments further comprises:

computer-readable program code means for performing one of (1) adding the result or (2) exclusive-ORing the result with the other one; and computer-readable program code means for then performing a bitwise rotation of an output of the computer-readable program code means for performing.

34. The computer program product according to claim 27, wherein the cipher supports a variable number of the Type-3 ciphering rounds and a variable number of the Type-1 ciphering rounds, a variable length of the input blocks, and uses a variable length subkey in the key-dependent invocation.

35. The computer program product according to claim 27, wherein at least one of the computer-readable program code means is embodied in hardware.

* * * * *